March 7, 1961 R. J. EHRET 2,974,237
CONTROL APPARATUS
Filed Jan. 26, 1956
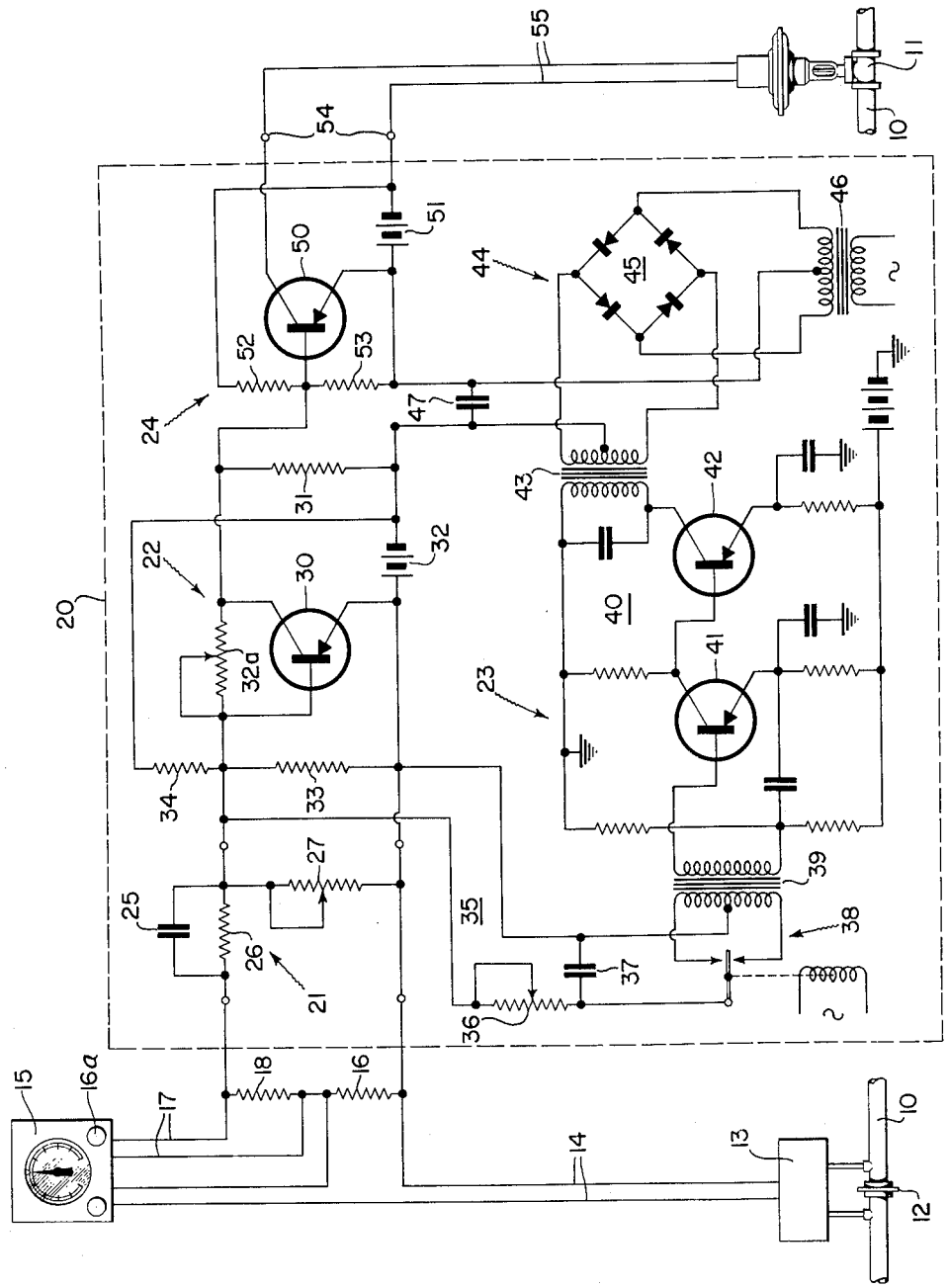
INVENTOR.
ROBERT J. EHRET
BY
*Arthur H. Swanson*
ATTORNEY.

United States Patent Office 2,974,237
Patented Mar. 7, 1961

2,974,237

CONTROL APPARATUS

Robert J. Ehret, Palo Alto, Calif., assignor to Minneapolis-Honeywell Regulator Company, Minneapolis, Minn., a corporation of Delaware Filed Jan. 26, 1956, Ser. No. 561,602

4 Claims. (Cl. 307—88.5)

A general object of the present invention is to provide a new and improved electrical controller adapted for use in regulating a process variable in accordance with signal variations produced by a process variable magnitude indicating means. More specifically, the present invention relates to improvements in electrical controllers permitting the use therein of transistor type amplifying elements notwithstanding certain inherent instabilities in such elements which tend to interfere with the overall stability and performance required of such controllers.

In the regulation of process variables, it is the customary practice in the prior art to sense the magnitude of a particular process variable, to compare the magnitude with a standard or reference, and to produce a control action if there is any deviation of the measured variable from the desired standard. The amount and type of control action effected depends upon the characteristics of the process variable being regulated. The magnitude of the control action for a particular deviation is generally adjustable. Such adjustment is referred to as a throttling range or proportional adjustment. In those applications in which it is desirable to introduce a time function into the control action, rate and/or the reset functions may be added. The rate function when added to the control action of a controller has the effect of producing an initial overcorrective action in accordance with the rate of change of a particular deviation. The reset function when added to the control action of the controller has the effect of eliminating the tendencies for the magnitude of the process variable to droop or become displaced from the set point or reference value over long periods of time. Droop tends to occur as a result of changes in the loading of the process, changes in furnace gas B.t.u., or some other change depending upon the type of process variable under control.

A more specific object of the present invention is to provide a new and improved electrical controller embodying desirable proportional, rate, and reset functions.

The ruggedness and small size of transistors recommend their use in controllers intended for industrial application, but certain inherent defects in transistors have presented apparently insurmountable obstacles to such use. One such defect is the tendency of transistors to drift in amounts considerably greater than can be tolerated, due to temperature changes and other factors. The present invention was devised to eliminate the adverse effects of such drift, and resulted from the recognition that the drift due to these amplifying components is analogous to the known process variable droop or drift encountered in the ordinary operation of process controllers. Further investigation and study showed that it is possible to eliminate the effect of the transistor drift in the same way that the process droop is eliminated, specifically, by utilizing the reset function of the controller. When transistors are used throughout, the reset section of the controller as well as the other sections should be adequately compensated by a reset configuration which will compensate for drift at any point in the control loop. This has been accomplished in the present invention by the provision of a so-called zero stable reset section.

It is accordingly a more specific object of the present invention to provide an electrical controller incorporating transistors as amplifying components in an arrangement such that the overall controller is stabilized and drift compensated.

Still another more specific object of the present invention is to provide an improved electrical controller incorporating a zero stable reset section operating in parallel with a proportional adjusting section in the controller to produce an output control action which varies proportionally with an input error signal and in accordance with a time integrated function of the error signal on the input of the controller.

A still further object of the present invention is to provide a direct coupled proportional band adjusting section in an electrical controller with a zero stable reset section operating in parallel therewith to control the output of the controller. To that end, the zero stable reset section desirably includes a zero stable converter for converting a direct current signal from an integrator into an alternating current signal capable of being readily amplified and the amplified quantity reconverted to a direct current signal for application in the output of the controller.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Referring to the single figure of the drawing, there is here shown a typical process variable control configuration where it is desired to provide means for measuring the flow of a fluid flowing through a conduit 10 and it is desired to regulate that fluid flow by means of a valve 11. In this representative process, it is desired that the flow be maintained at a preselected value and that any deviations thereof be corrected in an optimum manner without introducing any hunting or instabilities in the flow through the conduit 10.

For measuring the flow rate through the conduit 10, there is provided a conventional orifice plate 12 and pressure takeoffs next to the conduit 10 and leading through a differential pressure to current transducer 13. The transducer 13 is operative to produce an output current signal which is applied by leads 14 to a suitable indicator 15. The current flowing through leads 14 passes through a resistor 16 and produces a voltage drop there-across which is proportional to the current flowing through the transducer 13. The indicator 15 may well also include a set point or reference source which is adjustable by means of a knob 16a and which produces an output current flow of a value representative of the desired set point or reference for the process variable under control. This current flow will pass by way of lead 17 to a resistor 18. The transducer 13, the indicator and set point source 15, as well as the details thereof, may be of the type disclosed in the copending application of William F. Newbold, bearing Serial No. 391,207, filed November 10, 1953, now Patent No. 2,762,938.

The controller is indicated by the reference numeral 20 and includes a rate section 21, a proportional band or throttling band adjusting section 22, and a reset section 23 which are arranged to supply the control signals to an output section 24.

The rate circuit 21 comprises a condenser 25 having a resistor 26 connected in parallel therewith. Connected in series with the parallel connected condenser and resistor, across the input terminals to the controller, is an adjustable resistor 27. The adjustment of the resistor 27 in the circuit 21 is effective to vary the rate time of the rate circuit. The resistor 26 in conjunction with the resistor 27 forms a voltage divider across the controller input terminals so that steady state error signals on the input will appear upon the subsequent stages of the controller.

The proportional or throttling band adjusting section of the controller is indicated by the reference numeral 22 and comprises a transistor 30 having the usual base, emitter, and collector electrodes. The input to the transistor 30 is applied between the base and the emitter electrodes thereof. The output of the transistor is by way of an output resistor 31 which is connected in series with a power supply 32 between the emitter and collector of the transistor. To regulate the proportional band or throttling band of this amplifier section, there is provided a negative feedback path in the form of an adjustable resistor 32a. The adjustment of this resistor will determine the magnitude of the voltage drop across the resistor 31 in the output circuit with respect to the magnitude of the input voltage applied to the transistor 30. For stabilizing the potential of the base electrode of the transistor 30, there are provided a pair of resistors 33 and 34 which are connected in series with the battery 32 with the junction of the two resistors being connected to the base of the transistor 30.

The reset section 23 of the controller includes an integrator 35 comprising an adjustable resistor 36 and a condenser 37.

The output of the integrator 35 is applied to the contacts of a synchronous chopper type converter 38. The output of the converter is an alternating current signal and is passed by way of the transformer 39 to the input of a two stage transistor amplifier 40.

The transistor amplifier 40 comprises a pair of direct coupled transistors 41 and 42 connected in the common emitter configuration. The output of the amplifier 40 is by way of an output coupling transformer 43 which supplies an energizing signal to the phase sensitive rectifier 44. This phase sensitive rectifier 44 includes a rectifier bridge 45 to one pair of diagonal terminals of which the output from the transformer 43 is applied and to the other diagonal terminals of which is connected a reference transformer 46. The transformer 46 is energized by the same power supply as the converter 38 so that the two devices are effectively synchronously operative. The output from the phase sensitive rectifier 44 is filtered by a condenser 47. The output stage 24 comprises a transistor 50, also incorporating the normal base, emitter, and collector electrodes. The power supply for the transistor 50 is represented as a battery 51 and the base stabilizing elements for the transistor 50 are represented by resistors 52 and 53. The output current from the transistor 50 is supplied to the output terminals 54 and, by way of leads 55, the control signal may be used to control the operation of the valve 11.

In considering the overall operation of the present apparatus it should first be noted that the transducer 13 and the set point signal from the indicator 15 will be putting current signals through the resistors 16 and 18 indicative of the particular desired flow magnitude in the conduit 10 and the actual flow magnitude. The current flows through the resistors 16 and 18 are in opposition and, since these two resistors are connected in series to the input terminals of the controller 20, the net signal on the input of the controller 20 will be the difference between the voltage drops across the resistors 16 and 18. Under conditions of proper adjustment, the voltage drop across the resistor 16 will be exactly equal to the voltage drop across the resistor 18 so that there will be no net signal input to the controller 20. Under these conditions, the current flow to the valve 11 will be of such a magnitude as to maintain the valve in its present setting so that the flow through the pipe 10 will remain constant.

Should there be a step change in the fluid rate flowing through the conduit 10 due to some disturbance, there will be a resultant step change in the signal produced by the transducer 13 and thereby a step change in the voltage produced across the resistor 16. The appearance of a step change on the input of the rate circuit 21 will initially result in all of the step change appearing across the resistor 27 and due to the fact that the transient portion of the step will be bypassed around the resistor 26 by the condenser 25 so that the full effect will be across the resistor 27. The signal across the resistor 27 will be applied directly to the input of the transistor 30 by reason of the direct connection of the base and emitter to the end terminals of the resistor 27. The signal will be amplified by the transistor 30 and there will appear across the resistor 31 a signal proportional to the amplitude of the signal across the resistor 27. The magnitude of the signal across the resistor 31 will be directly dependent upon the setting of the proportional adjustable resistor 32a which in effect controls the gain of the transistor 30. The signal across the resistor 31 will be applied to the input of the transistor 50 by way of the direct connection of the base of the transistor 50 to the upper terminal of the resistor 31 and by way of the connection of the emitter of the transistor 50 to the lower terminal of the resistor 31 by way of a phase sensitive discriminator 44.

The signal input to the transistor 50 will again be amplified and will be applied by way of the output lead 55 to the control valve 11 so that an adjustment will be made in the opening of the valve corresponding to the magnitude of the signal passed through and acted upon by the controller 20. Due to the presence of the rate circuit 21, the initial adjustment of the valve 11 will in effect be an over adjustment which over adjustment will be eliminated as the condenser 25 begins to be charged by the error signal on the input of the controller. The extent to which the condenser 25 will eventually be charged will be dependent upon the voltage dividing ratio of the resistors 26 and 27 so that, under conditions of a continuing deviation signal on the input, the signal will be proportional to the division ratio of the resistors 26 and 27. Thus, the adjustment of the valve 11 will initially be a relatively large adjustment and the adjustment will back off to a preselected value proportional to the ratio of the resistors 26 and 27.

Under certain conditions, the momentary adjustment of the final control valve 11 will be effective to readjust the flow of the fluid in the conduit 10 to the desired extent and the error signal on the input of the controller 20 will be eliminated. Thus, the valve will be producing a controlling action which is yielding a fluid flow in the conduit 10 of a desired magnitude.

Should there be a sustained deviation of the measured variable from the desired set point, there will be a continuous input signal applied to the input terminals of the controller 20. Consequently, there will be a signal across the resistor 27 proportional to the magnitude of that continuously deviating signal. This signal will be applied to the integrator 35 inasmuch as the integrator 35 is connected directly across the resistor 27. The integrator 25 will be effective to produce a direct current signal on the condenser 37 with the condenser 37 slowly charging through the resistor 36 so that the net direct current signal across the condenser 37 will be an integrated time function of the error signal on the input of the controller 20. This integrated direct current signal is applied to the converter 38 where it is converted from a direct current into an alternating current. The alternating current produced by the converter 38 is passed through the transformer 39 to the alternating current amplifier 40. The output signal from the amplifier 40 is passed by way of the coupling transformer 43 to the phase sensitive rectifier 44. The alternating current signal from the transformer 43 will be compared with the reference signal from the transformer 46 in the rectifier bridge 45 and there will be produced across the output filter condenser 47 a direct current signal indicative of the integrated signal appearing across the condenser 37. This signal is coupled into the input circuit of the output stage 24 and is effectively in series with the signal produced across the resistor 31 by the proportional amplifier section 22. As the signal across the reset condenser 37 will be slowly changing with a continued deviation signal, the signal across the filter condenser 47 will likewise be slowly changing in a corresponding manner. This will introduce into the controlling action of the final output stage 24 a slowly varying signal which is in a direction to cause the valve 11 to be adjusted to correct and eliminate the deviation on the input of the controller 20. This resetting function will continue as long as there is a deviation between the set point signal and the measured variable signal and as soon as the deviation has been eliminated, will tend to hold the final control valve in the position where it will maintain the desired relationship between the set point signal and the measured variable signal.

Inasmuch as there are transistors used in the proportional section 22 and the output section 24, there is a tendency for there to be drift within the controller which drift will be reflected in the final control valve and produce an undesired adjustment of the final control valve. This adjustment will be reflected in a change in the measured variable so that there will be an error signal on the input of the controller 20. The error signal will be applied to the integrator 35 and the reset section 23 will be effective to produce a corresponding adjustment of the signal on the output stage 24 which will slowly move the valve to a position to correct for this undesired drift. Inasmuch as the integrator 35 will be producing effectively true integration of the signal on the input of the controller, this signal to this point will be uneffected by any drift present in the controller. By using a zero stable converter in the form of the converter 38, the signal across the condenser 37 will be converted into an alternating current signal and this alternating current signal will be amplified by the amplifier 40 acting as an alternating current amplifier. As the amplifier 40 is operating as an alternating current type amplifier, the drift normally inherent in this type of amplifier is minimized and has substantially no effect on the alternating current that is being amplified. Consequently, the signal appearing on the output transformer 43 and on the input of the phase sensitive discriminator 44 will be an alternating current which is truly representative of the signal across the condenser 37. Consequently, the direct current voltage appearing across the filter condenser 47 will vary substantially proportionally with the voltage across the condenser 37 and will not be effected by any drift in the reset section 23. As there is no adverse drifting effects in this reset section, the net result will be a signal on the input of the output stage which will always tend to compensate or eliminate the effects of drift arising elsewhere in the control loop, whether it be in the control process, per se, or in the forward loop of the controller formed by the proportional band stage 22 in the output stage 24.

While the principles of the present invention have been shown as applied to a transistorized type of electrical controller incorporating rate, proportional, and reset functions, it should be readily apparent that the principles hereof are applicable to any type of controller wherein drift in the controller components may be a troublesome factor. Further, while the present controller has been explained primarily in connection with a fluid flow control problem, it will be obvious that the principles are applicable to any type of process control including temperature, pressure, and the like.

Further, while the controller has been shown as a three mode controller, it will be obvious that the principles may be applied to a two mode controller wherein reset and proportional functions alone are required.

While, in accordance with the provisions of the statutes, there has been illustrated and described the best form of the embodiment of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

Having now described the invention, what it is desired to secure by Letters Patent is:

1. An electrical controller for producing an electrical signal variation which varies in accordance with the rate of change of an input signal, proportionally with the input signal and as an integrated function of the input signal comprising a pair of signal input terminals, a first resistor and a first condenser connected in series across the input terminals to form a rate circuit, a first transistor amplifier stage having an input and an output, means connecting said input to said first resistor, a controller proportionality adjusting means connected between the output and input of said stage, an integrator comprising a second resistor and a second condenser connected in series with each other and in parallel with said first resistor, a direct current to alternating current converter connected across said second condenser to produce an alternating current proportional to the integrated signal on said condenser, an alternating current amplifier connected to said converter, a phase sensitive discriminator connected to the output of said amplifier and producing a direct current signal, a second transistor amplifier stage having an input and an output, means connecting the output of said first transistor amplifier stage in series with said phase sensitive discriminator and the input of said second transistor amplifier stage, and a signal utilization means connected to the output of said second transistor amplifier stage.

2. An electrical controller comprising a pair of input terminals, a signal differentiating circuit connected to said input terminals, a direct coupled amplifier having a proportionality adjusting means connected thereto and connected at its input to said differentiating circuit, an integrating circuit including a stabilized amplifier connected at its input to said differentiating circuit, and an output amplifier stage connected to be controlled by the output signals from said direct coupled amplifier and said stabilized amplifier.

3. An electrical controller comprising a pair of signal input terminals, a resistance-capacitance differentiating circuit connected to said input terminals, a first transistor amplifier stage having its input connected to said differentiating circuit, a proportionality adjusting means for said first amplifier stage comprising a feedback resistor connected between the output and input of said amplifier, a resistance-capacitance integrating circuit connected to said rate circuit, said integrating circuit including a stabilized amplifier comprising a plurality of transistor amplifier stages, an output transistor amplifier stage, and means connecting said first transistor amplifier and said stabilized amplifier to said output stage to regulate the output thereof.

4. A controller as defined in claim 3 wherein said stabilized amplifier comprises a direct current to alternating current converter connected to said integrating circuit, said stabilized amplifier being connected to the output of said converter, and a phase sensitive alternating current to direct current converter connected to the output of said stabilized amplifier.

(References on following page)

References Cited in the file of this patent

UNITED STATES PATENTS

| | | |
|---|---|---|
| 2,175,985 | Callender et al. | Oct. 10, 1939 |
| 2,282,726 | Jones | May 12, 1942 |
| 2,498,101 | Wannamaker | Feb. 21, 1950 |
| 2,530,387 | Goertz | Nov. 21, 1950 |
| 2,608,678 | Marchment et al. | Aug. 26, 1954 |
| 2,684,999 | Goldberg et al. | July 27, 1954 |
| 2,694,169 | Ehret | Nov. 9, 1954 |
| 2,704,489 | Hammond | Mar. 22, 1955 |
| 2,709,205 | Colls | May 24, 1955 |
| 2,714,136 | Greenwood | July 26, 1955 |
| 2,778,883 | Buckerfield | Jan. 22, 1957 |
| 2,801,296 | Blecher | July 30, 1957 |
| 2,823,269 | Van Abbe et al. | Feb. 11, 1958 |